(12) United States Patent
Palmer

(10) Patent No.: US 7,677,514 B1
(45) Date of Patent: Mar. 16, 2010

(54) NO DRILL EQUIPMENT SUPPORT BRACKET

(75) Inventor: David Palmer, San Diego, CA (US)

(73) Assignee: Safety Pumping Systems, LLC, Carlsbad, CA (US)

( * ) Notice: Subject to any disclaimer, the term of this patent is extended or adjusted under 35 U.S.C. 154(b) by 0 days.

(21) Appl. No.: 12/121,963

(22) Filed: May 16, 2008

(51) Int. Cl.
*E04G 3/20* (2006.01)
(52) U.S. Cl. .................. 248/250; 248/228.1
(58) Field of Classification Search .......... 248/250, 248/205.1, 214, 220.21, 222.13, 223.31, 248/225.21, 228.1, 225.11; 280/490.1, 502, 280/769; 224/545, 547
See application file for complete search history.

(56) References Cited

U.S. PATENT DOCUMENTS

| | | | |
|---|---|---|---|
| 1,959,118 A | 5/1934 | Uffelman | |
| 3,580,599 A | 5/1971 | Dodgen et al. | |
| 3,989,213 A * | 11/1976 | Allen | 248/214 |
| 4,124,247 A | 11/1978 | Penner | |
| 4,717,055 A | 1/1988 | San Juan | |
| 4,760,986 A | 8/1988 | Harrison | |
| 4,998,277 A * | 3/1991 | Rioux, Jr. | 379/454 |
| 5,251,950 A | 10/1993 | Bernardo | |
| 5,560,576 A | 10/1996 | Cargill | |
| 5,711,397 A | 1/1998 | Flora et al. | |
| 5,893,599 A | 4/1999 | Strohfeldt | |
| 5,904,393 A | 5/1999 | Yoder | |
| 5,947,424 A * | 9/1999 | Heath | 248/58 |
| 5,967,553 A | 10/1999 | Cominsky | |
| 6,053,557 A | 4/2000 | Kooiker | |
| 6,256,844 B1 | 7/2001 | Wheatley | |
| 6,364,260 B1 * | 4/2002 | Lorincz et al. | 248/215 |
| 6,641,200 B2 | 11/2003 | Rusu | |
| 6,742,973 B1 | 6/2004 | Hendrix et al. | |
| 7,055,844 B1 | 6/2006 | Bostedt | |
| 2008/0116339 A1* | 5/2008 | Simonsen | 248/214 |

* cited by examiner

*Primary Examiner*—Ramon O Ramirez
(74) *Attorney, Agent, or Firm*—Nydegger & Associates (57) ABSTRACT

The invention is an equipment support bracket that can be secured to a vehicle frame without drilling holes. The top bracket has a top tang that fits over the top web of the frame. A bottom bracket has a bottom tang that secures against the bottom web. Once installed on the frame, tensioning bolts tighten the top tang against the top web. In one embodiment, the equipment can be first attached to the support bracket and then the support bracket with equipment attached is positioned between the top bracket and the rail of the frame. In another embodiment, the equipment bracket can be attached to an I beam frame.

17 Claims, 7 Drawing Sheets

NO DRILL EQUIPMENT SUPPORT BRACKET

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to equipment mounting brackets, and more particularly to equipment brackets that mount to a truck frame.

2. Description of Related Art

Utility vehicles are manufactured with a frame designed to support equipment and objects such as motors, pumps, tanks, controls, hose trays, storage boxes, fire extinguishers and hangars for pipes, hoses, cable and wire. Typically, these vehicle frames have a C shaped profile with horizontal top and bottom web members and a vertical rail member.

In order to mount heavy equipment, support brackets adapted to the desired equipment are attached directly to the vehicle frame. Holes are drilled in the frame and bolts are used to attach the support bracket. Drilling holes is permanent and can weaken a vehicle frame. If the holes are initially misaligned, redrilling can cause further damage to the frame. If equipment needs to be shifted on the frame, new holes must be drilled. When the equipment is removed, the holes remain in the frame. These existing holes may limit the ability to reuse the vehicle with different equipment.

Another problem is there may be a variation in the dimensions of the truck frames due to different manufacturers and the manufacturing process. As a result, pre manufactured clamp brackets may not always fit tightly causing rattle or unnecessary vibration.

One example where a no drill bracket is valuable is on vehicles used for fluid transport such as petroleum where several pieces of equipment such as pumps, valves, compressors, pipe brackets and controls are mounted to the truck frame or trailer frame under the tank. Aligning the equipment to permanent holes in the frame can be difficult due to the shape, weight and alignment of the equipment. Any misalignment or excess vibration due to loose brackets can cause premature failure or a fitting to leak or break.

What is needed is an equipment support bracket that can be mounted securely to a vehicle frame without the need for drilling holes. A support bracket that can be tightened against the vehicle frame to prevent rattling is desired. A bracket that can be attached to the equipment first and then coupled to the vehicle frame is also desired.

BRIEF SUMMARY OF THE INVENTION

The invention is an equipment support bracket that can be secured to a vehicle frame without drilling holes in the frame. The top bracket has a curved tang that fits over the top web of the frame. A bottom bracket has a bottom tang that secures against the bottom web. Once installed on the frame, tensioning bolts tighten the top tang against the top web of the vehicle frame.

In one embodiment, the equipment is first attached to a support bracket and then the support bracket with equipment attached is positioned between the top bracket and the rail of the frame and attached to the top bracket. The equipment can be aligned on the frame while supported by the top bracket. In another embodiment, the equipment is supported on the top bracket. In a further embodiment, the bracket can be attached to an I beam frame.

An embodiment of the invention is an apparatus for supporting an object on an elongated frame structure having parallel top and bottom web members oriented perpendicular to a rail member that comprises a first bracket member having an L profile with a first plate oriented perpendicular to a second plate, where the length of the first plate corresponds to the width of the top web, where the first plate has a top tang configured to engage the top web of the frame structure, a plurality of threaded tensioning apertures positioned in the second plate of the first bracket member, a plurality of threaded tensioning bolts configured to mate with the tensioning apertures, means for supporting an object coupled to the first bracket member, and means for engaging the bottom web member of the frame structure coupled to the first bracket member.

An aspect of the invention is where tightening the tensioning bolts against the rail member of the frame structure tightens the top tang against the top web member.

Another aspect of the invention is where the means for supporting an object comprises a second bracket member coupled to the first bracket member, where the second bracket member is positioned between the second plate of the first bracket member and the rail member, a plurality of object support flanges coupled to the second bracket member, where means for engaging the bottom web member of the frame structure is coupled to the second bracket member, and where tightening the tensioning bolts against the second bracket tightens the top tang of the first bracket against the top web member.

A further aspect of the invention is a plurality of first flanges attached to the second plate of the first bracket member, a plurality of first apertures positioned in the first flanges, a plurality of second flanges coupled to the second bracket member and positioned to align with the first flanges, a plurality of second apertures in the second flanges positioned to align with the first apertures in the first flanges, and a plurality of flange fasteners that couple the first flanges to the second flanges through the first apertures and the second apertures.

A still further aspect of the invention is where tightening the tensioning bolts against the second bracket bind the flange fasteners in the first and second apertures.

Another aspect of the invention is where the second apertures are elongated having a top and a bottom, the top of the second apertures positioned closer to the second bracket than the bottom of the second apertures, where tightening the tensioning bolts against the second bracket moves the second bracket towards the first plate of the first bracket.

A further aspect of the invention is where the means for engaging the bottom web member comprises a bottom plate configured to align with the bottom web member, where the length of the bottom plate is less than or equal to the width of the bottom web member, a curved bottom tang coupled to the bottom plate and configured to engage the bottom web member, a plurality of threaded couplers attached to the bottom plate, and a plurality of threaded fasteners configured to engage the threaded couplers.

A yet further aspect of the invention is where the means for engaging the bottom web member comprises a plurality of J bolts having distal and proximal ends, the distal end having a curved portion configured to engage the bottom web member, and the proximal end threaded and configured to receive a nut.

Another embodiment of the invention is a first bracket member having an L profile with a first plate oriented perpendicular to a second plate, where the length of the first plate corresponds to the width of the top web, where the first plate has a top tang configured to engage the top web of the frame structure, a plurality of threaded tensioning apertures positioned in the second plate of the first bracket member, a plurality of threaded tensioning bolts configured to mate with the tensioning apertures, where tightening the tensioning bolts against the rail member of the frame structure tightens the top tang against the top web member, an object support flange coupled to the first bracket member, and means for engaging the bottom web member of the frame structure coupled to the first bracket member.

Another aspect of the invention is where the means for engaging the bottom web member comprises a bottom plate configured to align with the bottom web member, where the length of the bottom plate is less than or equal to the width of the bottom web member, a curved bottom tang coupled to the bottom plate and configured to engage the bottom web member, a plurality of threaded couplers attached to the bottom plate, and a plurality of threaded fasteners configured to engage the threaded couplers, where the threaded fasteners secure the bottom plate to the first bracket member.

A further aspect of the invention is where the means for engaging the bottom web member comprises a plurality of J bolts having distal and proximal ends, the distal end having a curved portion configured to engage the bottom web member, the proximal end threaded and configured to engage the first bracket member.

A still further aspect of the invention is where the frame member is an I beam.

A further embodiment of the invention is a first bracket member having an L profile with a first plate oriented perpendicular to a second plate, where the length of the first plate corresponds to the width of the top web, where the first plate has a top tang configured to engage the top web of the frame structure, a plurality of threaded tensioning apertures positioned in the second plate of the first bracket member, a plurality of threaded tensioning bolts configured to mate with the tensioning apertures, a second bracket member coupled to the first bracket member, where the second bracket member is positioned between the second plate of the first bracket member and the rail member, a plurality of object support flanges coupled to the second bracket member, a bottom plate configured to align with the bottom web member, where the length of the bottom plate is less than or equal to the width of the bottom web member, a curved bottom tang coupled to the bottom plate and configured to engage the bottom web member, a plurality of threaded couplers attached to the bottom plate, and a plurality of threaded fasteners configured to engage the threaded couplers. and couple the second bracket member to the bottom plate, where tightening the tensioning bolts against the second bracket tightens the top tang of the first bracket against the top web member.

Another aspect of the invention is a plurality of first flanges attached to the second plate of the first bracket member, a plurality of first apertures positioned in the first flanges, a plurality of second flanges coupled to the second bracket member and positioned to align with the first flanges, a plurality of second apertures in the second flanges positioned to align with the first apertures in the first flanges, and a plurality of flange fasteners that couple the first flanges to the second flanges through the first apertures and the second apertures, where tightening the tensioning bolts against the second bracket binds the flange fasteners in the first and second apertures.

A further aspect of the invention is where the second apertures are elongated having a top and a bottom, the top of the second apertures positioned closer to the second bracket than the bottom of the second apertures, and where tightening the tensioning bolts against the second bracket moves the second bracket towards the first plate of the first bracket.

Another embodiment of the invention is a method of mounting equipment to a frame structure having parallel top and bottom web members oriented perpendicular to a rail member that comprises providing a first bracket having an L profile with a first plate oriented perpendicular to a second plate, where the first plate has a top tang configured to engage the top web of the frame structure, where the second plate has a plurality of threaded apertures and a plurality of tensioning bolts configured to mate with the threaded apertures, providing a second bracket configured to support equipment, providing a means for engaging the bottom web of the frame structure, attaching the equipment to the second bracket, positioning the first bracket with the top tang engaging the top web and the second plate parallel to the rail, positioning the second bracket with equipment attached between the second plate of the first bracket and the rail, coupling the first bracket to the second bracket, coupling the means for engaging the bottom web to the second bracket thereby engaging the bottom web, and tightening the tensioning bolts against the second bracket thereby tightening the tang against the top web.

Another aspect of the invention is where the means for engaging the bottom web comprises a bottom bracket having a tang and configured to couple to the second bracket.

A further aspect of the invention is where the means for engaging the bottom web comprises a J bolt.

A still further aspect of the invention is where tightening the tensioning bolts urges the second bracket toward the first plate of the first bracket.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 7. It will be appreciated that the apparatus may vary as to configuration and as to details of the parts, and that the method may vary as to the specific steps and sequence, without departing from the basic concepts as disclosed herein.

Figure 1:
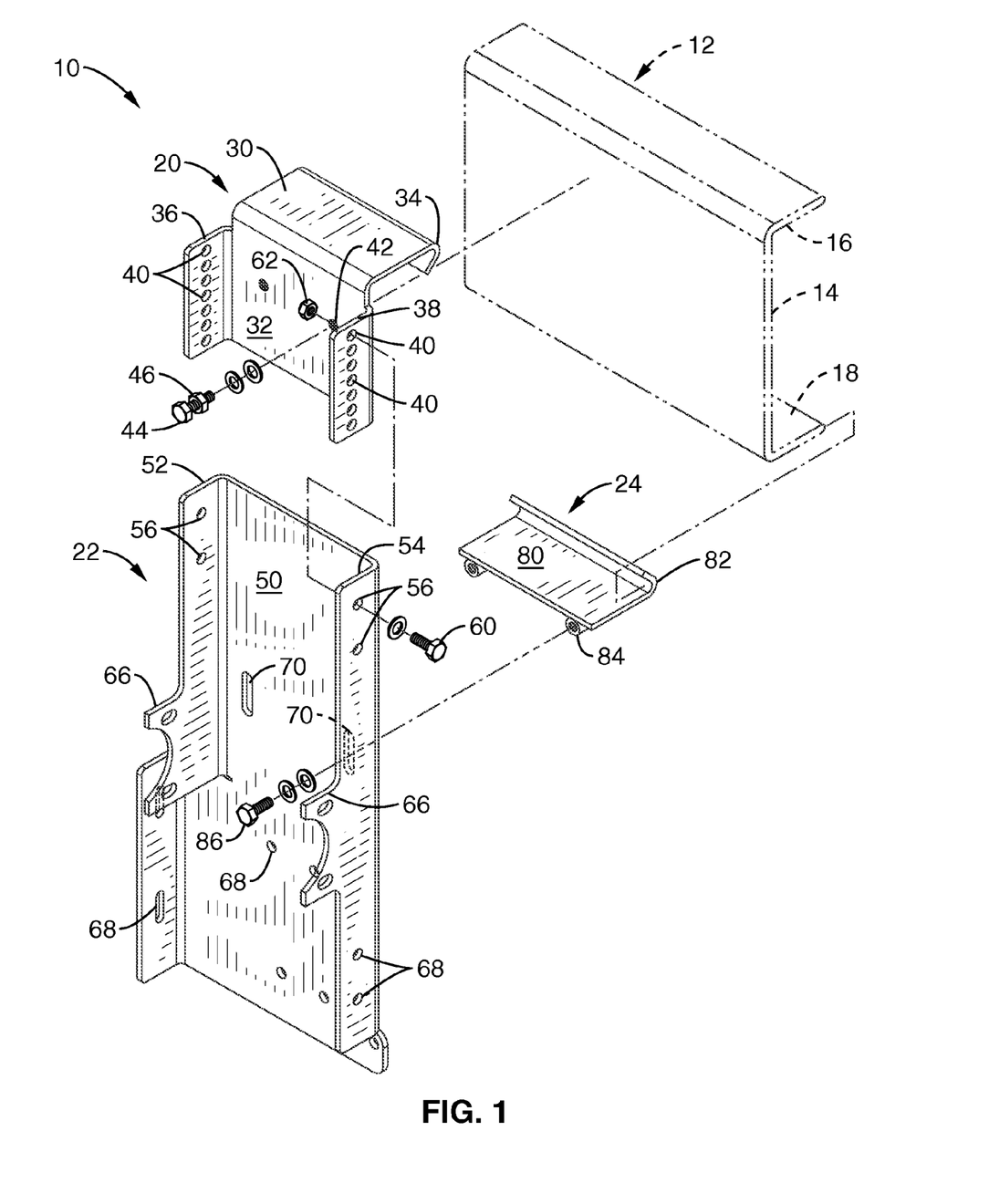
FIG. 1 is an exploded view of a mounting bracket assembly according to an embodiment of the invention.

FIG. 1 is an exploded view of a mounting bracket assembly 10 configured to mount to an existing truck frame structure 12 without drilling holes. Truck frame structure 12 has a "C" profile with a vertical frame rail 14, a top frame web 16 and a bottom frame web 18. The use of the terms top, bottom, vertical, horizontal, upward, downward, left and right are for convenience and clarity and do not limit the orientation of a frame structure or the mounting orientation of the invention on a frame structure.

Mounting bracket assembly 10 consists of three members; a top bracket 20, a support bracket 22 and a bottom bracket 24. The top bracket 20 consists of a horizontal top plate 30 and a vertical plate 32 connected perpendicular to top plate 30 with a profile of an inverted "L". Top plate 30 has a top tang 34 curved downward at the end configured to engage top frame web 16. The length of top plate 30 to the inside of top tang 34 corresponds to the length of top frame web 16. Vertical plate 32 has left and right flanges 36, 38 oriented vertical and generally perpendicular to vertical plate 32. A plurality of apertures 40 are positioned in flanges 36, 38. The number of apertures 40 depends on the variability of the dimensions of rail 14 and support bracket 22.

Two threaded apertures 42 are positioned between flanges 36, 38 in vertical plate 32 of top member 20. Apertures 42 can be reinforced by welding a nut on vertical plate 32 over the apertures. Two tensioning bolts 44 mate with apertures 42. In one embodiment, a fine thread pattern is used for apertures 42 and tensioning bolts 44. A lock nut 46 is preferred to keep tensioning bolt 44 from vibrating loose.

Support bracket 22 has a vertical support plate 50 with left, right support flanges 52, 54 oriented vertical and generally perpendicular to vertical support plate 50. The distance between left, right support flanges 52, 54 corresponds to the outer distance between left, right flanges 36, 38 in top bracket 20. A pair of support apertures 56 is positioned in left, right support flanges 52, 54 to align with a pair of apertures 40 in left, right flanges 36, 38 in top bracket 20. In one embodiment, support apertures 56 are elongated to make mating with top bracket 20 easier.

Bolts 60 with nuts 62 are preferred to secure apertures 56 with corresponding apertures 40 in top bracket 20. Other fasteners, such as clinch pins with cotter keys can also be used to secure the flanges. Additional left, right flange ears 66 and apertures 68 are illustrated in support bracket 22 to support objects and equipment to be mounted to truck frame 12. Examples of mounted equipment include hydraulic coolers, fuel tanks, oil reservoirs, power units, equipment boxes, steps, water tanks, hose reels, blowers, compressors, pumps, fire extinguishers, controls, and hangars for pipe, hose, cable, and tools.

A pair of elongated apertures 70 is positioned in vertical support plate 50 to engage bottom member 24. The distance from the top edge of support bracket 22 to apertures 70 corresponds with the length of rail 14 on truck frame 12.

Bottom bracket 24 has a horizontal flat plate 80 and a bottom tang 82 at one end of flat plate 80 curving upward. The distance from the inside of bottom tang 82 to the opposite edge of flat plate 80 is less than or equal to the length of bottom frame web 18. Two threaded couplers 84 are attached on the underside of bottom member 24 and are positioned to align with apertures 70 in support bracket 22. Bolts 86 are used to secure bottom member 24 to the bottom frame web 18 through apertures 70 and threaded couplers 84.

Figure 2:
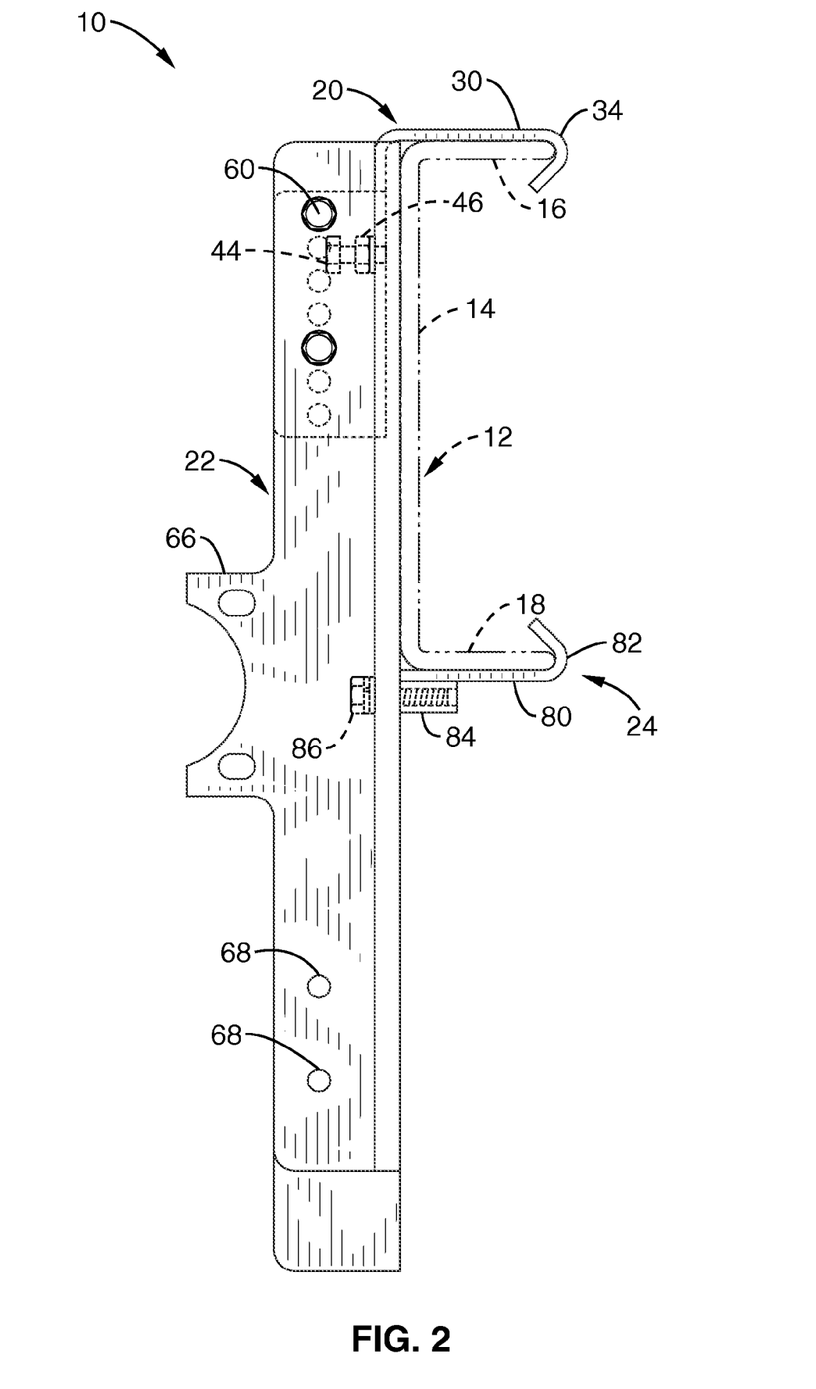
FIG. 2 is a cross section profile view of the invention shown in FIG. 1 mounted on a truck frame structure.

FIG. 2 is a cut away cross section view of mounting bracket assembly 10 shown in FIG. 1 mounted on truck frame structure 12. To assemble the mounting assembly, top tang 34 of top bracket 20 is hooked over top frame web 16 and vertical side 32 is positioned parallel to frame rail 14. Supporting bracket 22 is inserted between frame rail 14 and vertical side 32 of top member 20 and adjusted to the desired position. Bolts 60 are inserted through apertures 56 and 40 to support the support bracket 22 on bracket 20. Do not tighten nuts 62 to bolts 60 yet.

Bottom tang 82 of bottom bracket 24 is positioned on bottom web 18 and bolts 86 are inserted through apertures 70 and coupler 84 to secure to support bracket 22. At this point, the bracket can still be adjusted on the frame.

Bolts 86 are tightened to secure bottom bracket 24. Then, tensioning bolts 44 are tightened against support bracket 22. This will tighten top tang 34 against top web 16 and bind flange fasteners 60 in apertures 40 and 56. Tighten lock nuts 46 on tensioning bolts 44. Finally, tighten nuts 62 on flange bolts 60. The bracket will be secure against frame 12 and will not rattle or vibrate loose. One advantage of this mounting bracket system is that equipment can be pre-mounted to support bracket 22 and positioned on truck frame 12 with a jack of lift when installing the bracket.

If frame 12 has manufacturing variations in dimensions, the bracket assembly can accommodate these variations if apertures 56 are elongated or slightly larger than apertures 40. Mounting bracket 10 can be loosened and adjusted on the frame by loosening tensioning bolts 44 and bolts 86.

Figure 3:
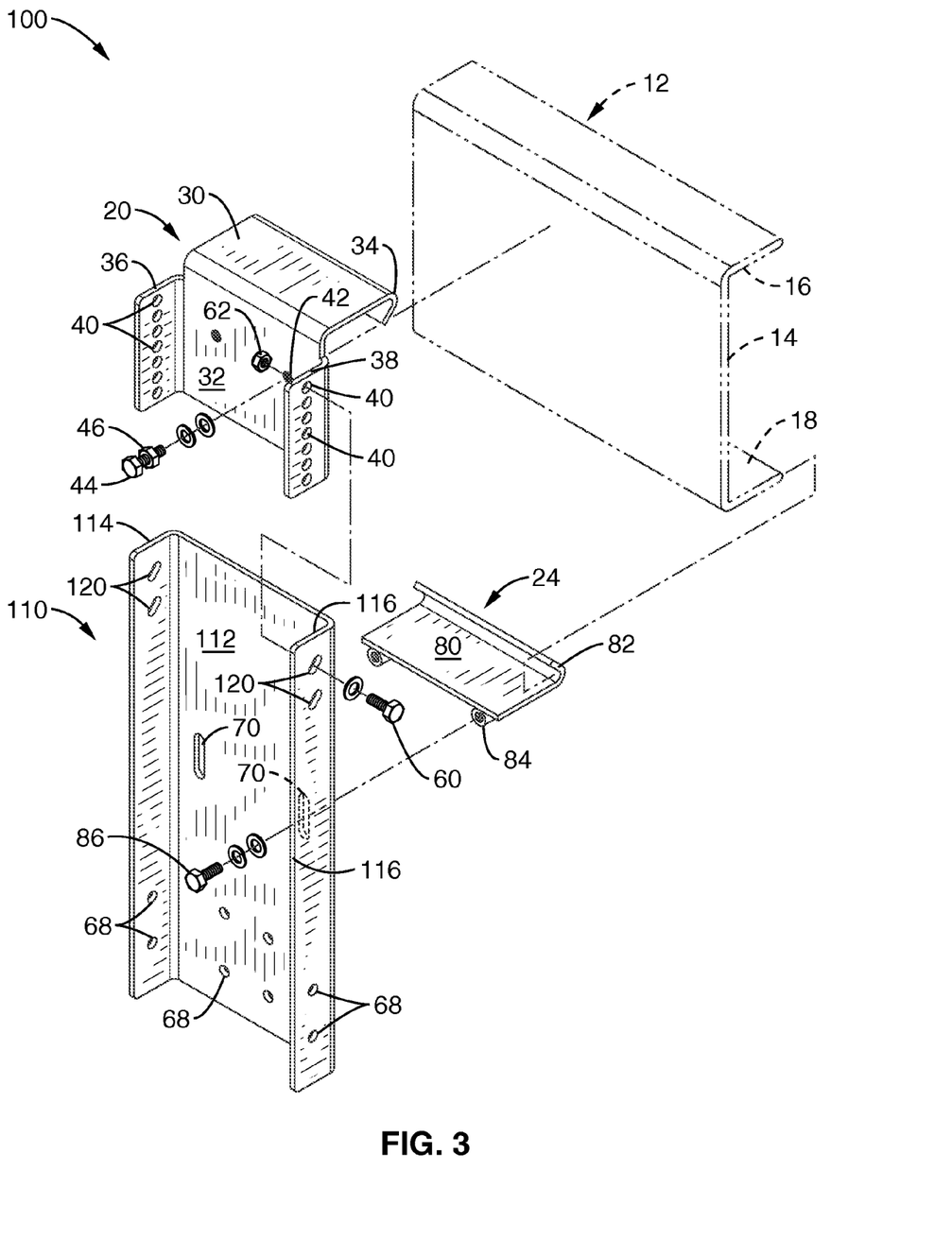
FIG. 3 is an exploded view of another embodiment of the invention.

FIG. 3 is an exploded view of another embodiment of a mounting bracket assembly 100 with a different support bracket 110. Support bracket 110 has vertical plate 112 and left right flanges 114, 116 with elongated apertures 120. Elongated apertures 120 are angled so the top of the aperture is toward vertical plate 112 and the bottom of the aperture is away from vertical plate 112. In one embodiment, elongated apertures 120 are angled at about 45 degrees. When the tensioning bolts 44 are tightened against vertical plate 112, support bracket 110 will be urged upward toward top bracket 20. This embodiment can be used where there may be significant variations in the dimensions of rail 14 and top web 16 of frame 12.

Figure 4:
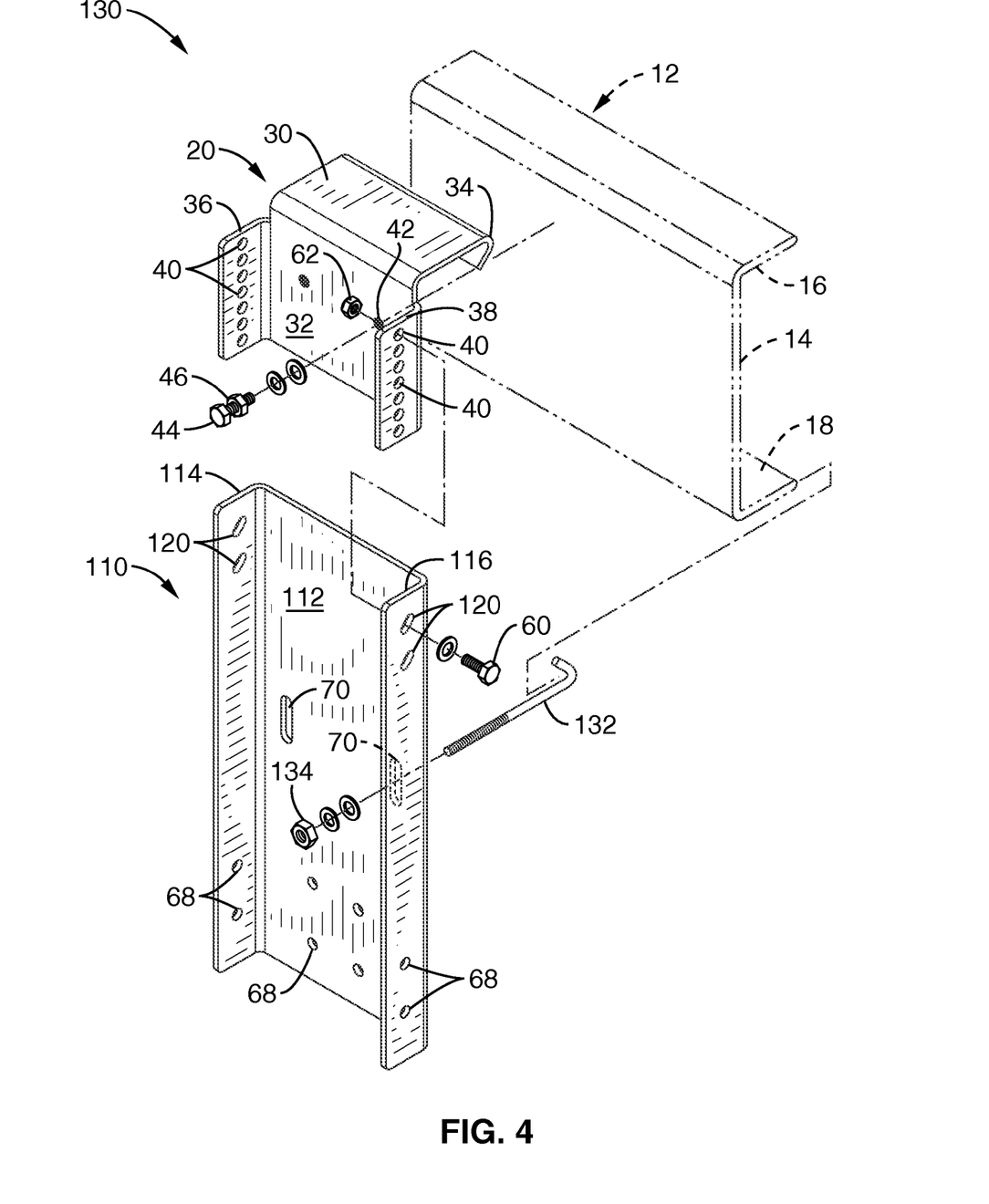
FIG. 4 is a perspective view of a further embodiment of the invention using J bolts.

FIG. 4 is an exploded view of a further variation of the mounting bracket shown in FIG. 3. Mounting bracket assembly 130 replaces the bottom bracket with J bolts 132 with the curved portion configured to engage bottom web 18. J bolts 132 are secured to support bracket 110 with nuts 134. The J bolts are secured before tightening tensioning bolts 44.

Figure 5:
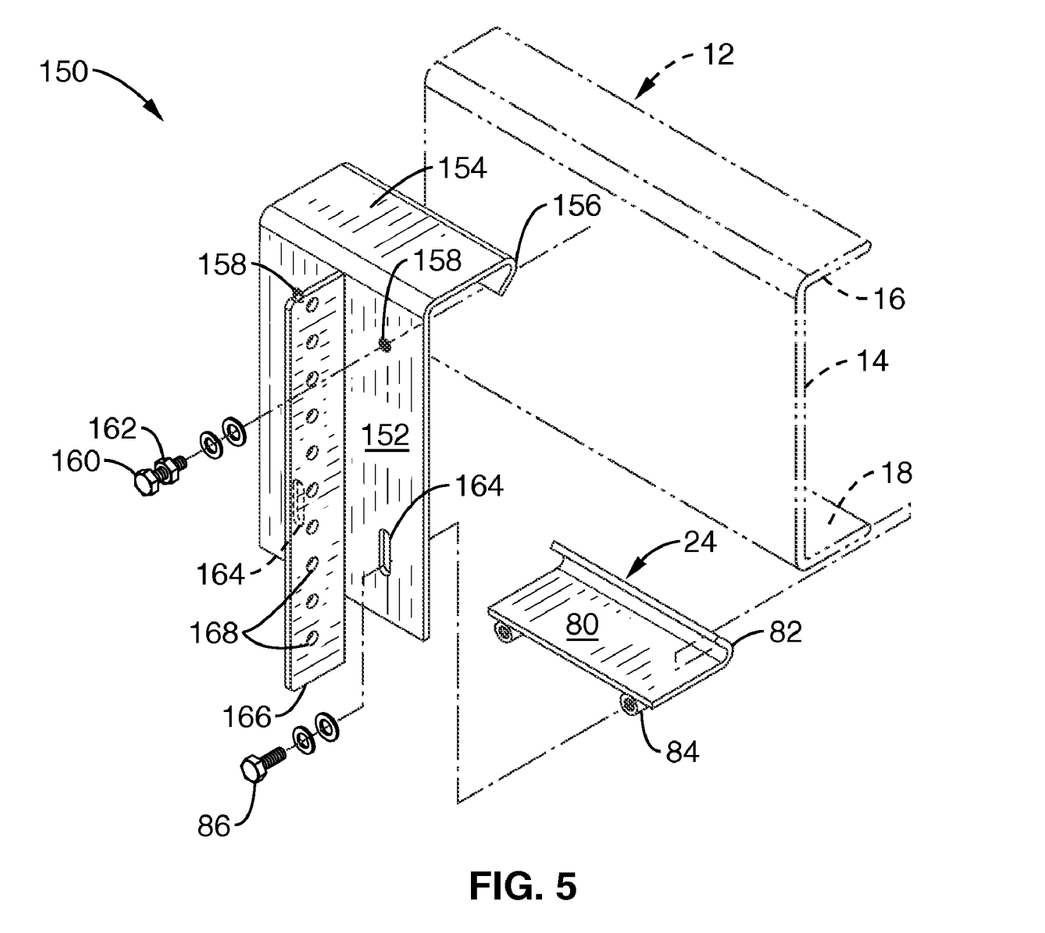
FIG. 5 is a perspective view of a still further embodiment of the invention that uses two components

FIG. 5 is an exploded perspective view of another embodiment of a mounting bracket assembly consisting of two members, a top bracket 150 and a bottom bracket 24. Top bracket 150 has a vertical plate 152 and a horizontal top plate 154 with a downward curved top tang 156. Two threaded tensioning apertures 158 are positioned in vertical plate 152. Tensioning bolts 160 are configured to thread through tensioning aperture 158 and contact rail 14 of frame 12. A locking nut 162 is preferred to keep tensioning bolt 160 from vibrating loose.

Elongated apertures 164 are positioned to receive bolts 86 that secure bottom bracket 24 against bottom web 18. A flange 166 with apertures 168 is used to support objects and equipment on frame 12.

To install the mounting bracket, top tang 156 is placed over top web 16 and vertical plate positioned along rail 14. Bottom bracket 24 is secured to bottom web 18 and to top bracket 150 with bolts 86. Tensioning bolts are tightened against rail 14 and locked with lock nut 162. Equipment or objects are attached to flange 166. In a variation of this embodiment, J bolts 132, shown in FIG. 4, are used instead of bottom bracket 24.

Figure 6:
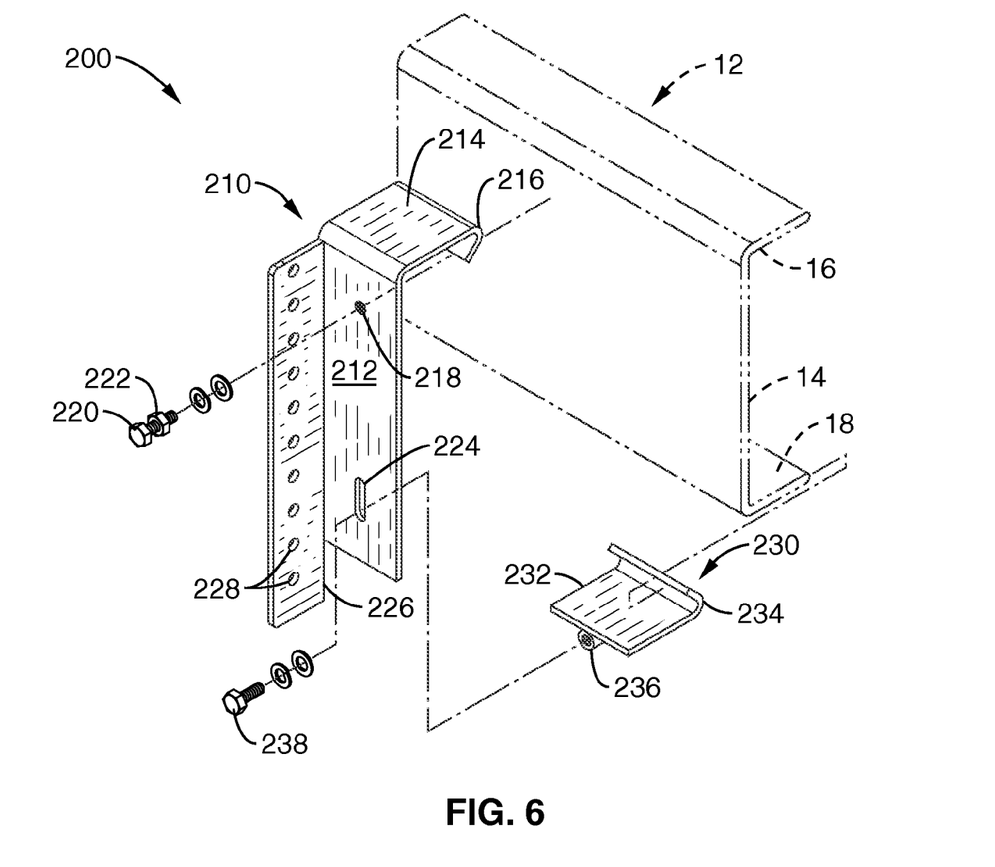
FIG. 6 is a perspective view of an embodiment of the invention with a narrow profile

FIG. 6 is an exploded perspective view of another embodiment of a mounting bracket assembly 200 that has a narrow profile. Top bracket 210 has a vertical plate 212, a top plate 214 and a downward curved top tang 216. One tensioning aperture 218 is positioned on vertical plate 212 and one tensioning bolt 220 with lock washer 222 is used. An elongated aperture 224 is positioned in vertical plate 212 for a bottom bracket or J bolt. A flange 226 is attached to the edge of vertical plate 212 with apertures 228 for supporting objects or equipment.

A bottom bracket 230 has horizontal plate 232 with an upward curved bottom tang 234 configured to engage bottom web 18. A threaded connector 236 is attached to horizontal plate 232. A bolt 238 is inserted through aperture 224 to secure bottom bracket 230. This bracket is mounted in similar fashion to the bracket shown in FIG. 5.

Figure 7:
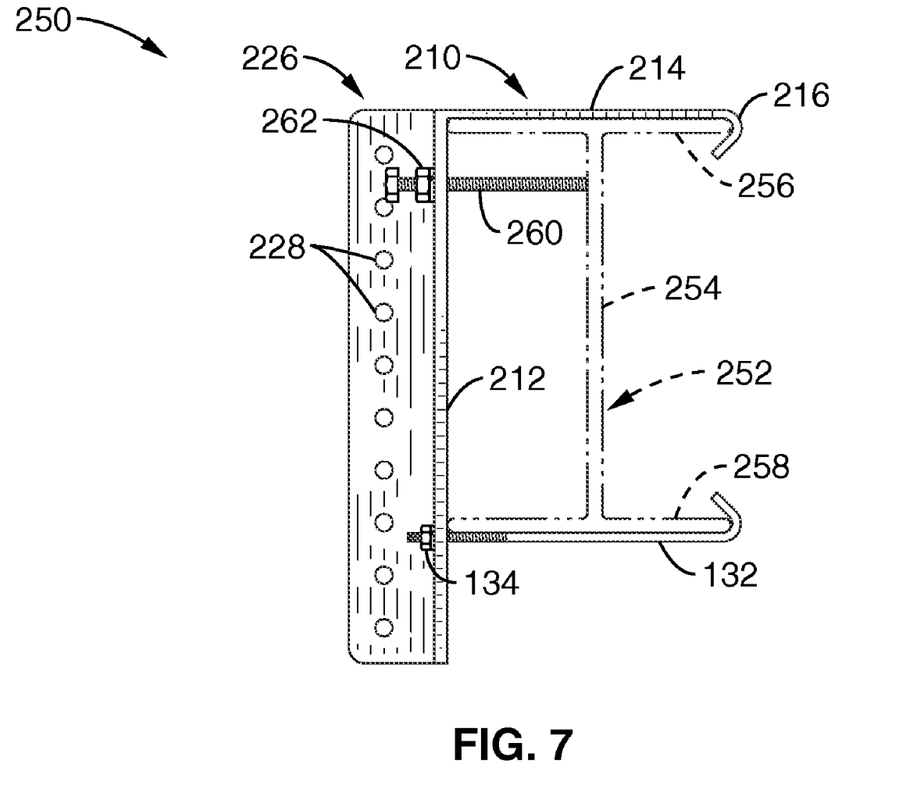
FIG. 7 is a profile view of the invention mounted on an I beam.

FIG. 7 is a profile view of a mounting bracket 250 mounted on an I-beam frame. I-beam frame has a center rail 254, a top web 256 and a bottom web 258. Top bracket 210 is similar to that shown in FIG. 6. Top tang 216 is placed over top web 256. A J bolt 132 is shown in this embodiment and secured through aperture 224 with nut 134. An elongated tensioning bolt 260 is threaded through aperture 218 until it contacts center rail 254 and tightens top tang 216 against top web 256.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for supporting an object on a frame structure having parallel top and bottom web members oriented perpendicular to a rail member comprising:
 a first bracket member having an L profile with a first plate oriented perpendicular to a second plate;
 wherein the length of said first plate corresponds to the width of the top web;
 wherein said first plate has a top tang configured to engage the top web of the frame structure;
 a plurality of threaded tensioning apertures positioned in said second plate of said first bracket member;
 a plurality of threaded tensioning bolts configured to mate with said tensioning apertures;
 means for supporting an object coupled to said first bracket member;
 means for engaging the bottom web member of the frame structure coupled to said first bracket member;
 a second bracket member coupled to said first bracket member;
 wherein said second bracket member is positioned between said second plate of said first bracket member and said rail member;
 a plurality of object support flanges coupled to said second bracket member; and
 wherein means for engaging the bottom web member of the frame structure is coupled to said second bracket member wherein tightening said tensioning bolts against said second bracket tightens said top tang of said first bracket against said top web member.

2. An apparatus as recited in claim 1, wherein tightening said tensioning bolts against the rail member of the frame structure tightens said top tang against said top web member.

3. An apparatus as recited in claim 1, further comprising:
 a plurality of first flanges attached to said second plate of said first bracket member;
 a plurality of first apertures positioned in said first flanges;
 a plurality of second flanges coupled to said second bracket member and positioned to align with said first flanges;
 a plurality of second apertures in said second flanges positioned to align with said first apertures in said first flanges; and
 a plurality of flange fasteners that couple said first flanges to said second flanges through said first apertures and said second apertures.

4. An apparatus as recited in claim 3, wherein tightening said tensioning bolts against said second bracket bind said flange fasteners in said first and second apertures.

5. An apparatus as recited in claim 3:
 wherein said second apertures are elongated having a top and a bottom;

said top of said second apertures positioned closer to said second bracket than said bottom of said second apertures;

wherein tightening said tensioning bolts against said second bracket moves said second bracket towards said first plate of said first bracket.

6. An apparatus as recited in claim 1, wherein said means for engaging the bottom web member comprises:
a bottom plate configured to align with the bottom web member;
wherein the length of said bottom plate is less than or equal to the width of the bottom web member;
a curved bottom tang coupled to said bottom plate and configured to engage said bottom web member;
a plurality of threaded couplers attached to said bottom plate; and
a plurality of threaded fasteners configured to engage said threaded couplers.

7. An apparatus as recited in claim 1, wherein said means for engaging the bottom web member comprises:
a plurality of J bolts having distal and proximal ends, said distal end having a curved portion configured to engage the bottom web member;
said proximal end threaded and configured to receive a nut.

8. An apparatus for supporting an object on an elongated frame structure having parallel top and bottom web members oriented perpendicular to a rail member comprising:
a first bracket member having an L profile with a first plate oriented perpendicular to a second plate;
wherein the length of said first plate corresponds to the width of the top web;
wherein said first plate has a top tang configured to engage the top web of the frame structure;
a plurality of threaded tensioning apertures positioned in said second plate of said first bracket member;
a plurality of threaded tensioning bolts configured to mate with said tensioning apertures;
wherein tightening said tensioning bolts against the rail member of the frame structure tightens said top tang against said top web member;
an object support flange coupled to said first bracket member; and
means for engaging the bottom web member of the frame structure coupled to said first bracket member wherein the bottom web member comprises a plurality of J bolts having distal and proximal ends, said distal end having a curved portion configured to engage the bottom web member, and wherein said proximal end is threaded and configured to engage said first bracket member.

9. An apparatus as recited in claim 8, wherein said means for engaging the bottom web member comprises:
a bottom plate configured to align with the bottom web member;
wherein the length of said bottom plate is less than or equal to the width of the bottom web member;
a curved bottom tang coupled to said bottom plate and configured to engage said bottom web member;
a plurality of threaded couplers attached to said bottom plate; and
a plurality of threaded fasteners configured to engage said threaded couplers;
wherein said threaded fasteners secure said bottom plate to said first bracket member.

10. An apparatus as recited in claim 8, wherein said frame member is an I beam.

11. An apparatus for supporting an object on an elongated frame structure with a C profile having parallel top and bottom web members oriented perpendicular to a rail member comprising:
a first bracket member having an L profile with a first plate oriented perpendicular to a second plate;
wherein the length of said first plate corresponds to the width of the top web;
wherein said first plate has a top tang configured to engage the top web of the frame structure;
a plurality of threaded tensioning apertures positioned in said second plate of said first bracket member;
a plurality of threaded tensioning bolts configured to mate with said tensioning apertures;
a second bracket member coupled to said first bracket member;
wherein said second bracket member is positioned between said second plate of said first bracket member and said rail member;
a plurality of object support flanges coupled to said second bracket member;
a bottom plate configured to align with the bottom web member;
wherein the length of said bottom plate is less than or equal to the width of the bottom web member;
a curved bottom tang coupled to said bottom plate and configured to engage said bottom web member;
a plurality of threaded couplers attached to said bottom plate; and
a plurality of threaded fasteners configured to engage said threaded couplers. and couple said second bracket member to said bottom plate;
wherein tightening said tensioning bolts against said second bracket tightens said top tang of said first bracket against said top web member.

12. An apparatus as recited in claim 11, further comprising:
a plurality of first flanges attached to said second plate of said first bracket member;
a plurality of first apertures positioned in said first flanges;
a plurality of second flanges coupled to said second bracket member and positioned to align with said first flanges;
a plurality of second apertures in said second flanges positioned to align with said first apertures in said first flanges; and
a plurality of flange fasteners that couple said first flanges to said second flanges through said first apertures and said second apertures;
wherein tightening said tensioning bolts against said second bracket binds said flange fasteners in said first and second apertures.

13. An apparatus as recited in claim 12:
wherein said second apertures are elongated having a top and a bottom;
said top of said second apertures positioned closer to said second bracket than said bottom of said second apertures; and
wherein tightening said tensioning bolts against said second bracket moves said second bracket towards said first plate of said first bracket.

14. A method of mounting equipment to a frame structure having parallel top and bottom web members oriented perpendicular to a rail member comprising:
providing a first bracket having an L profile with a first plate oriented perpendicular to a second plate;
wherein said first plate has a top tang configured to engage the top web of the frame structure;

wherein said second plate has a plurality of threaded apertures and a plurality of tensioning bolts configured to mate with said threaded apertures;

providing a second bracket configured to support equipment;

providing a means for engaging the bottom web of the frame structure;

attaching the equipment to said second bracket;

positioning said first bracket with said top tang engaging the top web and said second plate parallel to the rail;

positioning said second bracket with equipment attached between said second plate of said first bracket and the rail;

coupling said first bracket to said second bracket;

coupling said means for engaging the bottom web to said second bracket thereby engaging the bottom web; and tightening said tensioning bolts against said second bracket thereby tightening said tang against the top web.

15. A method as recited in claim 14, wherein said means for engaging the bottom web comprises a bottom bracket having a tang and configured to couple to said second bracket.

16. A method as recited in claim 14, wherein said means for engaging the bottom web comprises a J bolt.

17. A method as recited in claim 14, wherein tightening said tensioning bolts urges said second bracket toward said first plate of said first bracket.

* * * * *